UNITED STATES PATENT OFFICE.

GIUSEPPE BRUNI, OF MILAN, ITALY, ASSIGNOR TO PIRELLI & CO., OF MILAN, ITALY, A COMPANY OF ITALY.

PROCESS FOR THE VULCANIZATION OF RUBBER.

1,386,153.     Specification of Letters Patent.     Patented Aug. 2, 1921.

No Drawing.     Application filed March 9, 1920. Serial No. 364,478.

*To all whom it may concern:*

Be it known that I, GIUSEPPE BRUNI, a subject of the King of Italy, residing at Milan, Kingdom of Italy, have invented certain new and useful Improvements in Process for the Vulcanization of Rubber, of which the following is a specification.

The object of the present invention is a development of the process forming the subject of my companion application No. 364,477, filed March 9, 1920. It consists in the employment of the quantities of sulfur usually employed in the ordinary hot vulcanization or of the smaller quantities of sulfur indicated in said companion application, or in the employment of suitable quantities of substances or mixtures containing sulfur and adapted to yield up the latter. The process makes it possible to attain among other practical advantages the following:—

(1) To vulcanize in a much shorter time than otherwise required, which permits economy in fuel and an increase in factory production.

(2) To obtain vulcanization at temperatures lower than those usually employed in hot vulcanization, for example below 100°, and even at ordinary temperatures, so that it is possible to vulcanize in hot water or tepid water, thereby avoiding the use of steam under pressure, and even by allowing the compound or the article produced to stand.

(3) To improve the durability and mechanical qualities of the vulcanized rubber thus produced.

The first of the above mentioned objects is aimed at by a number of processes based upon the use of basic substances or of aromatic nitroso-derivatives but these processes give very imperfect results. A vulcanization which can be effected by treating the article to be vulcanized without accelerators at 145° C. for one hour and a half, requires at least half an hour at the same temperature when the most powerful of the known accelerators are added. On the other hand by using the reagents forming the subject of my companion application in the proportion of from 2 to 0.2% of the rubber present in the compound, a complete vulcanization is obtained within 5 minutes at 120° C. or in a longer time at lower temperatures at which the addition of the accelerators hitherto proposed do not even start a vulcanization. Moreover the products obtained by the present process are improved in mechanical qualities and durability.

The reagents employed in the present process are the same as those specified in the aforesaid companion application, viz: salts of bivalent or trivalent metals of the N-monoalkyl-, or N. N.-dialkyl-, or N. N. alkylene,- dithiocarbamic acids, or other mono- or disubstituted dithiocarbamic acids, having the general formulas

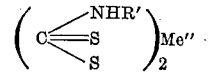

or

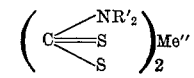

or

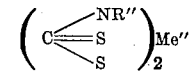

where R' can be an alkylic or other monovalent organic radical or chain, R'' an alkylenic radical or other organic bivalent radical with open or closed chain, etc., and M'' a bivalent metal such as Mg, Zn, Cd, Hg and the like, or an inorganic bivalent radical such as uranyl and the like.

Corresponding formulas may be adopted for the salts of trivalent metals such as Al, Fe, Cr, Sb, etc.

The process is carried out by adding to mixtures of rubber and sulfur suitable quantities of the reagents named.

I claim as my invention:

1. The process of vulcanizing rubber, consisting in treating it with sulfur and a metallic salt of a dithiocarbamic acid, and heating it to a temperature lower than 100° C.

2. The process of vulcanizing rubber, consisting in treating it with sulfur and a salt of a bivalent metal of a dithiocarbamic acid, and heating it to a temperature lower than 100° C.

3. The process of vulcanizing rubber, consisting in treating it with sulfur and a metallic salt of a disubstituted dithiocarbamic acid, and heating it to a temperature lower than 100° C.

4. The process of vulcanizing rubber, consisting in treating it with sulfur and a metallic salt of a dithiocarbamic acid having the general formula

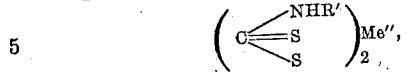

where R' is a monovalent organic radical, and heating it to a temperature lower than 100° C.

5. The process of vulcanizing rubber, consisting in treating it with sulfur and a metallic salt of a dithiocarbamic acid having the general formula

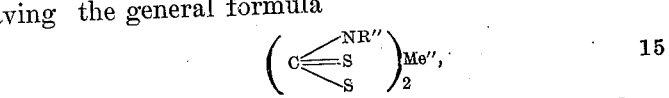

where R'' is a bivalent organic radical, and heating it to a temperature lower than 100° C.

In testimony whereof I affix my signature.

GIUSEPPE BRUNI.